T. J. HUME.
LAUNDRY MARKING MACHINE.
APPLICATION FILED OCT. 14, 1914.

1,196,114.

Patented Aug. 29, 1916.
6 SHEETS—SHEET 1.

WITNESSES:
Frank R. Glow
[signature]

INVENTOR
T. J. Hume
BY
[signature]
ATTORNEY

INVENTOR
T. J. Hume

UNITED STATES PATENT OFFICE.

THOMAS J. HUME, OF KANSAS CITY, KANSAS.

LAUNDRY-MARKING MACHINE.

1,196,114.  Specification of Letters Patent.  Patented Aug. 29, 1916.

Application filed October 14, 1914. Serial No. 866,597.

*To all whom it may concern:*

Be it known that I, THOMAS J. HUME, a citizen of the United States, residing at Kansas City, in the county of Wyandotte and State of Kansas, have invented certain new and useful Improvements in Laundry-Marking Machines, of which the following is a specification.

This invention relates to laundry-marking machines of that class comprising a printing member or printing members adjustable to produce at a certain point a line of type characters constituting a printing member or line-means for inking such printing member or line and then withdrawing therefrom preliminary to returning to normal position, and means for clamping the article or object and pressing it firmly upon such printing member or line and then returning to initial position, and the chief objects of the invention in addition to producing an efficient, compact, strong and durable machine which can be operated with great rapidity, are as follows: To provide a plurality of character segments adapted for individual adjustment from normal or inoperative position, to present the selected characters of the adjusted segments in printing alinement at the point where the inking means and article or object carried by the clamping means are successively disposed; to provide means whereby the adjusted segments are simultaneously released for return to normal position automatically by gravitative or equivalent force; to provide cushioning means for checking such return and then withdrawing to permit the segments to attain their normal or inoperative positions without shock or jar and undue noise; to provide means for clamping the article with a force proportional to that required to carry it to the printing member or line; to provide a rotary inking means and a fulcrum eccentric to that about which the bodily movement of the inking means occurs, for rotating the inking device during its bodily movement, to cause its ink-applying surface to engage the printing member or line; to provide means for preventing excessive rotary movement of the inking means; to insure direct pressure of its ink-applying face onto the printing member or line; to provide means for holding the said fulcrum stationary in the initial part of the withdrawing movement of the inking means and thereby effect reverse rotation of the inking means and then a yielding resistance to continue such reverse turning movement without arresting the bodily withdrawing movement and to again reverse the rotation of the inking means as the same is returning to initial position after its withdrawing movement is completed and the clamping means is returning to normal position; to provide means for effecting bodily movement of the inking means away from the printing member as the first-named reversed rotation of said means begins; to provide a construction whereby the ink-applying face of the inking means is automatically replenished with ink through the said reverse rotation of the inking means, and to provide means for effecting bodily movement of the inking means away from the printing member in the latter part of its returning movement to normal position.

Another object is to provide a hollow liquid ink fountain having an ink applying pad accessible to the ink so that upon the rotation of the fountain incident to its withdrawing movement, the ink shall flow to and replenish the pad, the surplus ink on the pad flowing back into the body of the ink during and after the return movement of the inking means to its initial position.

With these and other objects in view as hereinafter appear, the invention consists in certain novel and peculiar features of construction and organization as hereinafter described and claimed; and in order that it may be fully understood, reference is to be had to the accompanying drawings, in which—

In the said drawings where like reference characters identify corresponding parts in all of the figures, 1 is a base or stand provided with an opening 2 in the front edge of its top, and secured upon the stand is a casing 3, the top and front edges of the side walls of which curve concentrically with respect to a stationary cross shaft 4 mounted in said walls. The walls are provided in their edges below the plane of the shaft with recesses 5 for the accommodation of mechanism hereinafter described, and above said recesses or notches are covered by a plate 6 which for convenience of access to the interior of the casing is pivoted at its upper end as at 7, and is secured at its lower end by screw bolts 8, which extend through it into lugs 9 projecting inwardly from the side walls of the casing. For convenience in holding the hinged plate 6 in opened position, a catch 10 is pivotally suspended from it so that when the plate is swung up the catch 10 will be swung forward and eventually ride upon a stud 11 of the casing, a pin 12, in fixed relation to the plate preventing the catch from accidentally riding over and back of stud 11, and for convenience in tripping the catch it is provided with a forwardly projecting finger 13 at its upper end upon which rearward pressure may be applied for the purpose mentioned.

The plate 6, hereinafter termed a "character plate," is provided near its opposite margins with characters, the alphabet and the numerals, 0 to 9 inclusive, and extending horizontally from the characters are horizontal gage lines 15. Between the columns of letters and figures is a plurality of parallel slots 16, through which project handles 17 of character segments 18 journaled on shaft 4 within the casing, type characters being formed on the peripheries of said segments as customary. The segments are provided with heels 19 for engagement at times with the stop pin 20 which extends transversely of the casing and forms the pivot for lever 21 arranged at one side of the series of segments, said pivot also serving to secure to the lower end of the lever a socket bracket 22, equipped with a forwardly projecting bumper 23 of rubber or equivalent material. The lever terminates at its front end in a laterally projecting handle 24 which extends through a slot 25 in the adjacent side of the casing, and to return and hold the lever in elevated position, a retractile spring 21ª connects it with a fixed point of the casing. Secured to the lever is a downwardly disposed hook 26 engaging one arm of a U-shaped rock frame 27 pivoted to a fixed cross shaft 28, and said lever is provided with a cross piece 29 overlying a series of pawls 30, spaced apart by washers 30ª, and pivoted on a cross pin 31 secured to the casing, springs 32 carried by a cross bar 33, normally holding the pawls in engagement with ratchet teeth 34 formed on the segments 18, it being understood that the segments are of skeleton form so that shafts 28 and 31 and cross piece 29 and pawls 30 and other adjacent parts described, may occupy the positions shown, without interfering with the operation of the segments.

Figure 3:
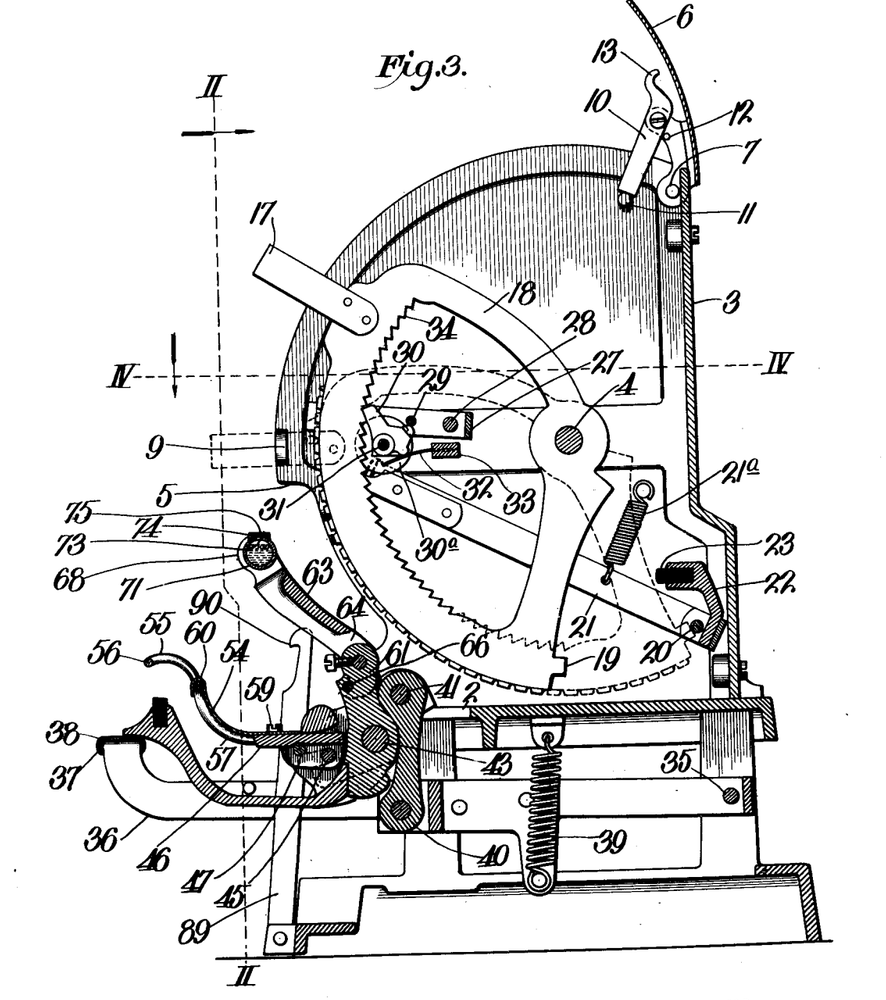
Fig. 3, is a vertical section on the line III—III of Fig. 2.
Figure 4:
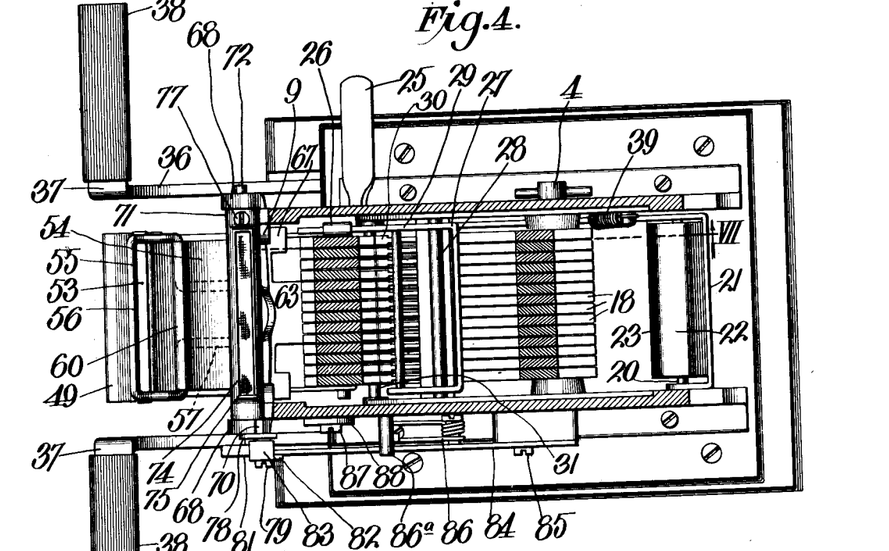
Fig. 4, is a horizontal section on the line IV—IV of Fig. 3.
Figure 7:
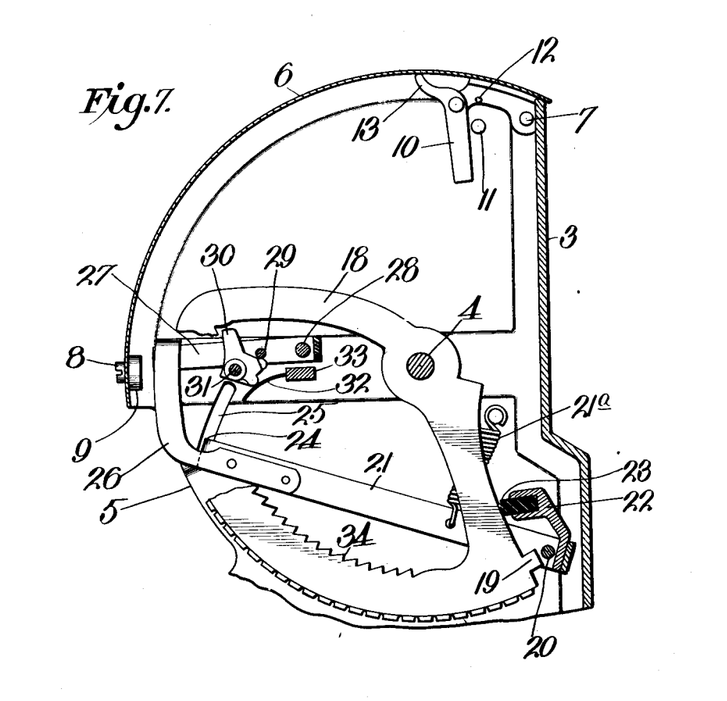
Fig. 7, is a vertical section in the plane of the dotted line VII of Fig. 4, with the tripping lever depressed and the bumper in position to receive the impact of the marking segments.
Figure 8:
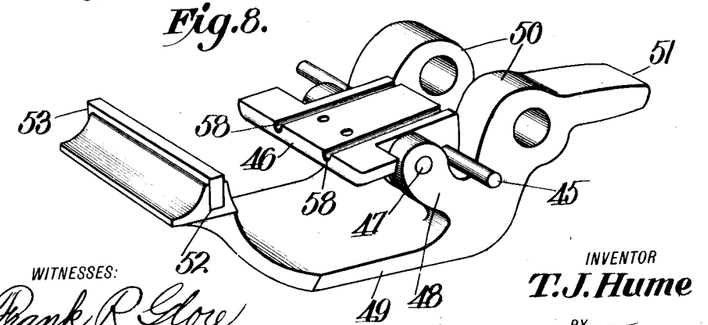
Fig. 8, is a detail perspective view of a part of the clamping mechanism for holding the laundry and pressing it against the marking type.
Figure 9:
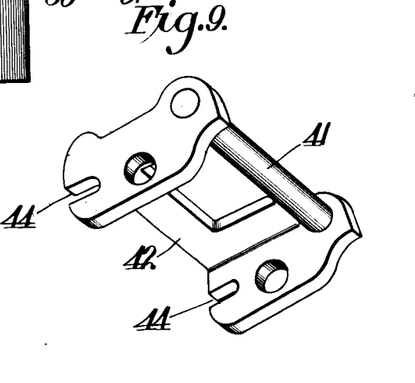
Fig. 9, is a perspective view of the link frame for operating the clamping members.
Figure 10:
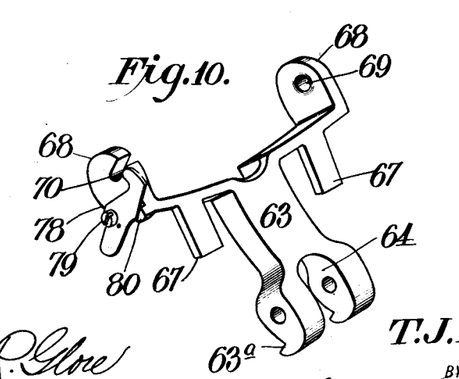
Fig. 10, is a sectional perspective view of the ink fountain carrying frame.

From the foregoing it will be apparent that the pawls 30, through engagement with ratchet teeth on their respective segments hold the latter at the desired point of adjustment as shown in full lines Fig. 3, and that when the lever is depressed, by pressure applied on handle 24, the bumper 23 is swung forward as indicated in Fig. 7, and the rock frame 27 swings downward to cause its cross piece 29 to trip the pawls out of engagement with the segments. As this occurs the segments move downward by gravity until they strike the bumper 23, rebounding more or less according to the initial positions of the segments. Almost instantly however, they all attain a position at rest against the bumper and then the operator releases the handle and permits spring 21ª to reëlevate the lever, this action being instantly followed by the settling of the segments until their heels 19 are arrested by the pivot 20, and the restoration of the pawls and the reelevation of the swing frame 27 to operative position under the pressure of the springs 32 on the pawls. With the segments thus occupying their lowest positions of adjustment their characters or type are below the plane which they occupy for imprinting or marking laundry, as hereinafter described, and to dispose any selected type in the position necessary for effecting their printing or marking functions, the operator by means of handles 17 individually adjusts upwardly the desired segments until the handles of such segments are disposed in transverse alinement with the corresponding characters on the character plate, the ratchet teeth being so disposed and proportioned that the pawls will hold the segments with their characters in transverse alinement.

Pivoted to the stand at 35 is a horizontally arranged U-shaped lever 36 terminating in outwardly projecting handles 37 preferably equipped with rubber sheaths 38 for the comfort of the operator, and said lever is connected by a retractile spring 39 to the casing. 40 is a link pivotally connected to lever 36 and extending upwardly through opening 2 in the top of the stand and pivoted on a cross pin 41 at the rear end of a rock lever 42 fitting in opening 2 and journaled on a stationary shaft 43 secured in the top of the stand at the front end thereof. The said rock lever is formed in the front ends of its sides with notches 44 receiving outwardly projecting arms 45 of a clamping lever 46 fitting between and pivoted at 47 to a pair of upwardly projecting lugs 48 on another or lower clamping lever 49, the same having upwardly projecting spaced perforated lugs 50 pivoted on shaft 43 and an arm 51 projecting rearwardly from one of said lugs 50 below the cross pin 41 of the rock lever and adapted to impinge against the under side of the top of the stand to positively limit downward movement of the front end of the clamping lever 49. The front end of the lever curves upward and is equipped with a socket 52 wherein is secured a rubber or equivalent compressible platen 53 of sufficient length to accommodate any line of type selected for printing or marking purposes. To coöperate with this platen in clamping a piece of laundry firmly thereon, the clamping lever 46 has clamped thereon by an extension plate 54, a wire clamping frame 55, which is of skeleton arched form at its front end to arch over the platen and clamp thereon a piece of laundry. Specifically this frame comprises a piece of wire bent to form a loop 56 of which the ends are arched so as to be capable of overlying the platen to permit the front and rear sides of the loop to occupy a horizontal plane below the top of the platen as the clamping of the piece of laundry occurs, and rearwardly projecting arms 57 of inverted arcuate form at their front ends, the rear ends of the arms fitting in grooves 58 of lever 46, within which grooves they are firmly clamped by the plate 54 secured to said lever by screw bolts 59, and to guard against the goods being caught between the arms of and to stiffen the wire frame, the plate 54 bridges the space between the said arms for their full length and is hooked at its front end at 60 around the rear side of the loop.

Normally the clamping levers are held spaced apart as shown clearly in Fig. 3, by the pull of spring 39, as under said pull lever 36 is elevated and through link 40, rocks the rock lever 42 downward at its front end, and said lever through the engagement of its notches 44 with arms 45 of clamping lever 46, depresses the rear end of said lever and thereby raises its front end from engagement with the platen, it being noted that the upper front portion of rock lever 42, limits such movement by striking upon the clamp lever 46 rearward of the plane of its pivotal connection at 47 with the lower clamping lever.

Mounted on shaft 43 between lugs 50 of the lower clamping lever and extending up through the rock lever 42 is a rock bar 61 shouldered at its lower end upon and constituting in effect an arm of the lower clamping lever 49 and pivotally connected at its upper end by a pivot rod 62 to the stem of a substantially T-shaped frame 63, the upper end of said bar fitting in a bifurcation 64 in the lower end of the stem of said frame, and to hold said frame pressed yieldingly toward the marking mechanism, a pair of springs 65 are mounted on the extended ends of the pivot 62 and bear at their opposite ends against the laterally projecting arms 66 of rock arm 61 and arms 67 of the T-shaped frame. The frame 63 is provided at its upper end with a pair of upwardly projecting ears 68, one ear having a journal opening 69 and the other a journal slot or opening 70.

Figure 11:
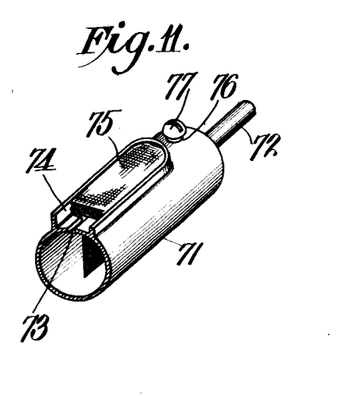
Fig. 11, is a sectional perspective view of a modified form of ink fountain.

Fitting between ears 68 is an ink fountain 71 provided with pintles 72 journaled in openings 69 and 70. The fountain is preferably of cylindrical form and provided in its normally upper side with one or more ink discharge openings 73 establishing communication between the interior of the fountain and the external chamber 74 containing an ink pad 75. The ink fountain shown by Fig. 11, has its pad 75 in the form of a piece of folded fabric arranged in the chamber 74 and having one end extending through the slot 73 into the fountain for the purpose of conveying ink by capillary attraction from the interior of the fountain to the pad. The fountain is provided with a filling hole 76 and a closing plug 77 therefor.

To guard against the accidental disengagement of the fountain, the ear provided with opening 70 carries a pivoted retainer 78 secured permanently in place by a screw 79, and adapted to engage a stop 80 on said ear and thereby prevent the retainer from binding upon the adjacent pintle and acting as a brake on the fountain in its oscillatory movement hereinafter referred to. Secured rigidly on the pintle outward of said retainer 78 is a cross head 81 and pivotally connected to the same rearward of the axis of the fountain is a link 82, having a lip 83 normally overhanging the rear end of the cross head and adapted to be struck by and arrest the rearward rotation of the latter to guard against excessive rearward rotation of the ink fountain when being positioned to ink a line of type of the segments, and said link is pivoted at its lower end to the front end of a swing arm 84 pivoted at 85 to the side of the casing 3, a spring 86 pending to hold the swing arm elevated and the fountain with its pad disposed upwardly. A stop pin 86ª projects from the casing 3 to limit the upward movement of the swing arm.

Figure 1:
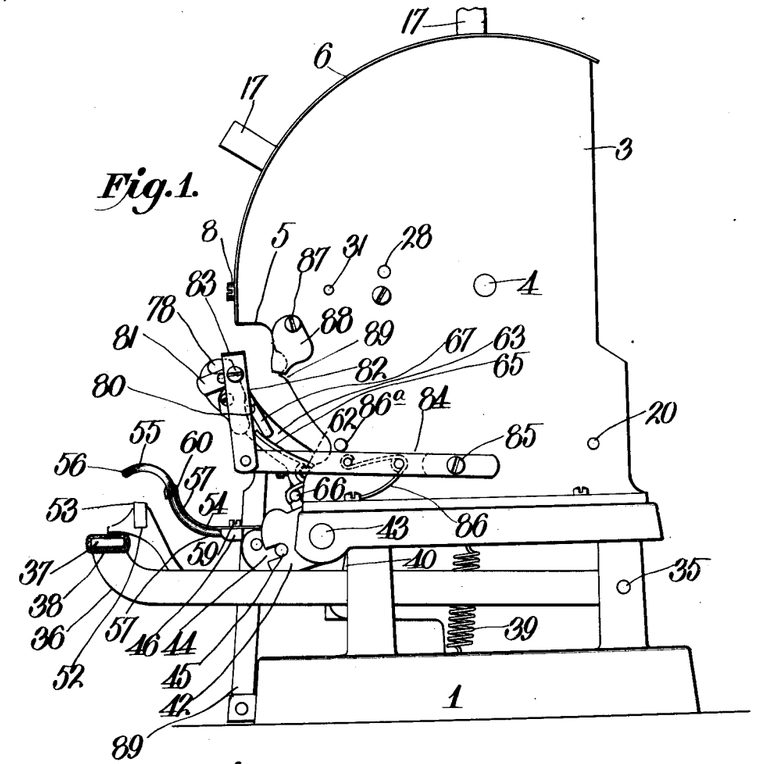
Figure 1, is a side elevation of a laundry marking machine embodying my invention.
Figure 2:
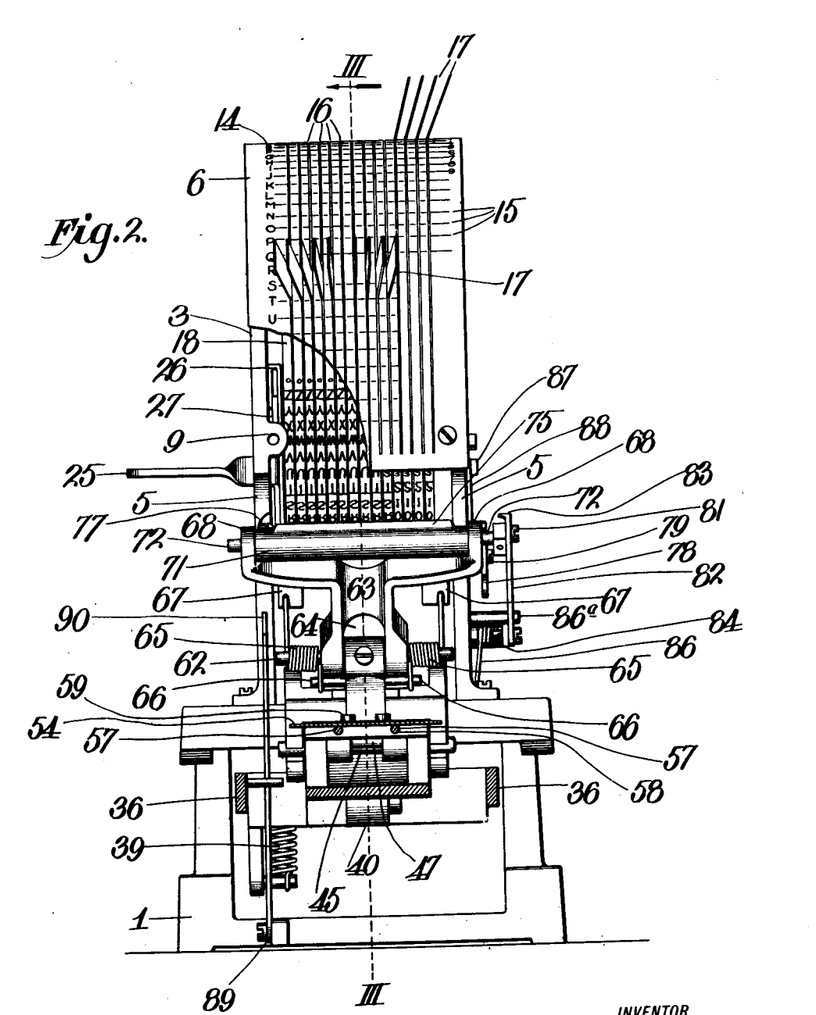
Fig. 2, is a vertical section on the line II—II of Fig. 3, partly broken away.
Figure 5:
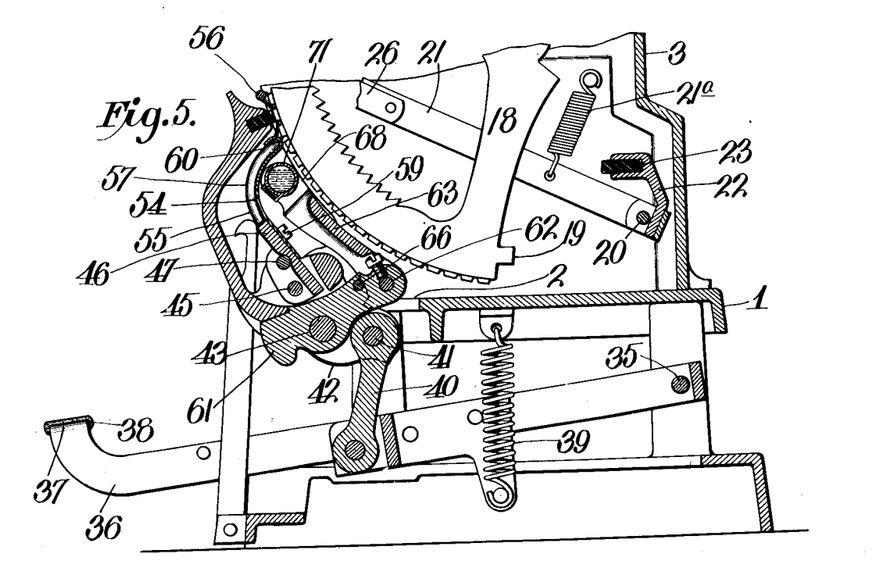
Fig. 5, is a vertical section corresponding to Fig. 3, with the parts in marking position.
Figure 6:
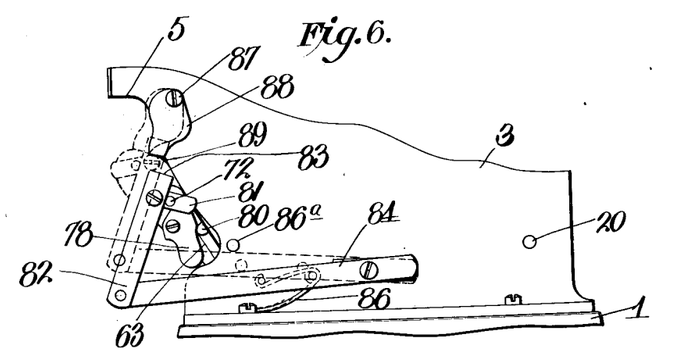
Fig. 6, is a fragmentary side view illustrating the inking mechanism in certain positions it assumes while the machine is being operated.

In the path of movement of the ink fountain toward the segments and pivotally suspended at 87 on the outside of the casing so that it shall overlap one of the recesses 5 thereof, is a deflecting plate 88 which is struck and swung back by the fountain or one of the ears 68 when the fountain swings to operative position and which swings back to the position shown in Fig. 1, as the fountain is drawn to the position shown in Figs. 5 and 6, so that when the fountain is re-elevated following the removal of pressure from the handles 37, it or the said adjacent ear strikes the lower end of the deflecting plate and causes the same to swing outwardly from the position shown by full to the position shown by dotted lines in Fig. 6, the outward swing thus imparted to the deflecting plate causing the fountain-carrying frame 63 to swing so as to avoid any possibility of the fountain coming into engagement with the segments on its return to normal position.

Assuming that the parts are in the position shown by Fig. 1, the operator grasps a collar or other article of apparel or garment to be marked, slips it over the platen and with practically the same movement applies downward pressure on the handles 37. As a result of this action, the upper clamping member is brought down upon the collar or other article and clamps the same firmly to the platen. Immediately following this action the lower clamping member rocks shaft 43, the fountain-carrying frame moving with it and the fountain simultaneously rotating so that its pad shall receive and press against the line of type of the previously adjusted segments, it being understood that in the action thus far described the pivotal point of connection between link 82 and lever 84 is stationary and consequently the upward swing of the fountain carrying frame from a point eccentric of said pivotal point of the link, results in the latter exerting a downward pull on the rear end of the cross-head and therefore rotating the ink fountain to dispose its pad to properly engage the line of type to ink the same.

As the downward pressure on the handles continues, the rock arm 61, moving with them exerts a downward pull on the fountain carrying frame and the latter at this time in engagement with the front edge of the casing 3 and therefore incapable of moving farther rearward, must move downward within the recesses 5 of the casing as indicated in Fig. 6, and to guard against dragging on the type which are in engagement with the pad at the time this downward movement begins, the bases or bottoms of the recesses 5 are provided with outwardly projecting cam lugs 89, which press the ink fountain outwardly or forwardly so that it will become disengaged from the lines of type without dragging thereon.

The springs 65 yield to accommodate the relative approaching movement of the clamping mechanism and fountain carrying frame, and as the downward movement of said frame begins and the cams push the fountain outward as explained, the pivot 83 acts as a fulcrum to cause the ink fountain to rotate forwardly as it rolls downward upon the bottoms of the recesses 5 below the cams. This rotative action continues without effecting the depression of the swing arm 84 until the cross head 81 has swung downward until the pintles of the fountain are disposed between and substantially in line with the pivoted ends of link 82. As this occurs the downward movement of the fountain carrying frame exerts a direct downward pull upon the link and overcomes the resistance of spring 86 to effect the depression of the swing arm. During the depression of the swing arm, the forward rotation of the ink fountain continues until the cross head has rotated a sufficient distance to substantially invert the ink fountain to cause the ink to pass through the opening or openings 73 and thus reink the pad. By the time the ink fountain has been thus inverted, the clamping mechanism has swung upward its full distance and the platen has pressed the clamped article firmly against the line of type whereby the said article receives the desired impression.

By reference to Fig. 5, particularly, the necessity for bending the front end of the clamping members upward will be apparent, as by so bending space is provided for the accommodating of the inking fountain when in pad-reinking position.

Immediately after the article is marked or printed as explained, the pressure on the handles is relaxed and the spring 39 re-elevates lever 36 and thereby relowers the clamping mechanism. As this pressure is relaxed and the spring forces the lever 36 up to normal position, the swing arm 84 is pressed upward by its spring 86 and through link 82 reverses the rotative action of the ink fountain and at the same time the springs 65 by pressing upwardly and rearwardly against the fountain carrying frame, rotates the ink fountain within the recesses 5 until the upper end of one of the ears 68 of said frame encounters the lower end of the deflecting plate 88, which is caused to swing forward and thus thrust the upper end of the fountain carrying frame in the same direction. During this movement the reverse rotation of the fountain continues through the connection of its cross head with the link 82 and at the same moment the forwardly projecting toes 63ª of the bifurcated stem of the fountain carrying frame engage the arms 66 of the arm 61 to prevent the springs 65 from swinging said frame rearward on pivot 62.

As the lower clamping member 49 and the fountain carrying frame attain their initial positions, the still slightly extended spring 39 exerts sufficient pull to compel the reelevation of the lever 36 and through the link 45 rocks frame 42 downward at its front end and through the engagement of the notches of the same with the arms 45 rocks the upper clamping member to respace its front end some distance above the platen 53 when the machine is ready to receive a second article to be marked unless it is desired to readjust the segments to arrange a new line of type, in which event certain operations hereinbefore described are performed.

If access to the type is desired for cleaning or other purposes or it is desired to oil the rod 62 on which the fountain carrying frame is pivoted, said frame can be grasped and pulled downward to approximately a horizontal position and the catch 89 pivoted to the front end of base or stand is swung forward until its hook engages over the upper part of said frame. In this action the link 82 swings forward approximately ninety degrees and exerts sufficient downward pressure to compress spring 86. When the catch is swung back the spring 65 reelevates the fountain-carrying frame and the spring 86 reëlevates the swing arm 84 until the latter is arrested by engagement with the stop pin 86ᵃ.

From the above description it will be apparent that I have produced a laundry-marking machine embodying the features of advantage enumerated as desirable, and I wish it to be understood that while I have illustrated and described the preferred embodiment of the invention I reserve the right to make all changes falling within the spirit and scope of the appended claims:

I claim:

1. In a laundry marking machine, a casing, a shaft therein, a series of peripherally charactered segments journaled on the shaft, means for holding each segment at the required point of adjustment to dispose any desired group of characters thereon in the said printing line, means for collectively tripping the holding means to permit the movement of the adjusted segments to normal or inoperative position, a cushion to receive the impact of the segments in returning to said normal or inoperative position, means to withdraw the cushion from the path of the segments to permit the same to continue their movement until they reach their normal or inoperative position.

2. In a laundry marking machine, a casing, a shaft therein, a series of peripherally charactered segments journaled on the shaft, means for holding each segment elevated the required distance to dispose any desired group of characters thereof in a horizontal or printing line, means for collectively tripping the holding means to permit the elevated segments to swing downward to inoperative position, a cushion to receive the impact of the segments on their downward movement, means to withdraw the cushion from the path of the segments to permit the same to finish their downward movement, and means for arresting such continued movement.

3. In a laundry marking machine, a casing, a shaft therein, a series of peripherally charactered segments journaled on the shaft, means for holding each segment elevated the required distance to dispose any desired group of characters thereof in a horizontal or printing line, means for collectively tripping the holding means to permit the elevated segments to swing downward to inoperative position, a cushion to receive the impact of the segments on their downward movement, means to withdraw the cushion from the path of the segments to permit the same to finish their downward movement, and a rod for positively determining such continued downward movement and effecting transverse alinement below the printing line, of the topmost characters of the segments.

4. In a laundry marking machine, a casing, a shaft therein, a series of peripherally charactered segments journaled on the shaft, means for holding each segment elevated the required distance to dispose any desired group of characters thereof in a horizontal or printing line, a cushion, means to collectively trip the holding means, and a lever for disposing the cushion in the path of downward movement of the segments and actuating the tripping means.

5. In a laundry marking machine, a casing, a shaft therein, a series of peripherally charactered segments journaled on the shaft, means for holding each segment elevated the required distance to dispose any desired group of characters thereof in a horizontal or printing line, a cushion, means to collectively trip the holding means, a lever for disposing the cushion in the path of downward movement of the segments and actuating the tripping means, and means to return the lever to normal position and thereby withdraw the cushion from the path of the segments, and release the tripping means.

6. In a laundry marking machine, a casing a shaft therein, a series of peripherally charactered segments journaled on the shaft, means for holding each segment elevated the required distance to dispose any desired group of characters thereof in a horizontal or printing line, a cushion, means to collectively trip the holding means, a lever for disposing the cushion in the path of downward movement of the segments and actuating the tripping means, means to return the lever to normal position and thereby withdraw the cushion from the path of the segments and release the tripping means, and yielding means for restoring the holding means and tripping means to normal position.

7. In a laundry marking machine, a casing, a shaft therein, a series of peripherally charactered segments journaled on the shaft and provided with downwardly facing ratchet teeth spaced to correspond with the spacing of the peripheral characters, a spring actuated dog engaging the ratchet toothed surface of each segment to hold the same at the desired point of adjustment, a rock frame for collectively tripping the dogs and normally held elevated thereby, a lever provided with a downwardly disposed hook to actuate the rock frame to trip the dogs, and a spring to restore the lever to normal position.

8. In a laundry marking machine, a pivoted clamping member, a second or upper clamping member pivoted to the first-named clamping member, a suitably mounted lever, connections whereby the depression of the front end of said lever shall rock the second member downward at its front end for clamping it around upon the front end of the first-named member and then rock both members upwardly at their front ends around the axis of the first-named member, and a spring for effecting the return of said lever and, through said connections, the said clamping members to normal position.

9. In a laundry marking machine, a clamping member suitably fulcrumed, a second clamping member pivoted to the first-named member, a yieldingly positioned lever, a rock lever fulcrumed coincidentally with the first-named clamping member and having a pin and slot connection with the other clamping member, and a link pivotally connecting the yieldingly-positioned lever with said rock-lever.

10. In a laundry marking machine, a clamping member suitably fulcrumed, a second clamping member pivoted to the first-named member, a pivotally-positioned lever, and a rock lever pivotally engaging the second clamping member and linked to said yieldingly-positioned lever; said rock-lever also normally pressing upon the said second clamping member to limit the automatic action of the yieldingly-positioned lever.

11. In a laundry marking machine, a pivoted clamping member, a second or upper clamping member pivoted to the first-named clamping member, a suitably mounted lever, connections whereby the depression of the front end of said lever shall rock the second member downward at its front end for clamping it around the front end of the first-named member and then rock both members upwardly at their front ends around the axis of the first-named member, a spring for effecting the return of said lever and, through said connections, the said clamping members to normal position, and type characters settable to form a printing line against which the article carried by said clamping members shall be pressed when said lever is depressed.

12. In a laundry marking machine, a pivoted clamping member, a second or upper clamping member, a suitably mounted lever, connections whereby the depression of the front end of said lever shall rock the second member downward at its front end for clamping it around the front end of the first-named member and then rock both members upwardly at their front ends around the axis of the first-named member, a spring for effecting the return of said lever and, through said connections, the said clamping members to normal position, type characters settable to form a printing line against which the article carried by said clamping members shall be pressed when said lever is depressed, and means for inking the line of type characters before the clamped article is pressed thereagainst.

13. In a laundry marking machine, type characters settable to form a printing line, a rock arm, a frame mounted on said rock arm to swing a limited distance toward the said printing line and normally held yieldingly at such limit, type inking means carried by said frame and a yieldingly positioned lever connected to normally hold said frame swung forward from the printing line and adapted when operated to swing said frame rearward to press the inking device upon said printing line.

14. In a laundry marking machine, type characters settable to form a printing line, a rock arm, a frame mounted on said rock arm to swing a limited distance toward the said printing line and normally held yieldingly at such limit, type inking means carried by said frame, a yieldingly positioned lever connected to normally hold said frame swung forward from the printing line and adapted when operated to swing said frame rearward to press the inking device upon said printing line, and then draw the frame downward to dispose the inking device below the plane of said inking line, and unyielding means for holding the inking device and the frame carrying the same, away from the type characters as the inking device is thus lowered.

15. In a laundry marking machine, type characters settable to form a printing line, an inking device, a swing frame carrying said device, yielding means tending to swing the frame toward the printing line to press the inking device thereagainst, means for swinging said swing frame rearward until the inking device is pressed against the printing line with sufficient force to overcome the pressure upon said frame of said yielding means and then impart downward movement to said frame and inking device to a plane below that of the printing line, and means to press the swing frame forwardly or outwardly as the depressing movement begins to prevent the inking device dragging on the printing line.

16. In a laundry marking machine, type characters settable to form a printing line, an inking device, a swing frame carrying said device, yielding means tending to swing the frame toward the printing line to press the inking device thereagainst, means for swinging said swing frame rearward until the inking device is pressed against the printing line with sufficient force to overcome the pressure upon said frame of said yielding means and then impart downward movement to said frame and inking device to a plane below that of the printing line, and means to restore the swing frame and the means for operating the same to normal position.

17. In a laundry marking machine, type characters settable to form a printing line, an inking device, a swing frame carrying said device, yielding means tending to swing the frame toward the printing line to press the inking device thereagainst, means for swinging said swing frame rearward until the inking device is pressed against the printing line with sufficient force to overcome the pressure upon said frame of said yielding means and then impart downward movement to said frame and inking device to a plane below that of the printing line, and means to restore the swing frame and the means for operating the same to normal position, and means for pressing the swing frame outward during its return to normal position to guard against reëngagement of the inking means with the printing line.

18. In a laundry marking machine, type characters settable to form a printing line, an inking device, a swing frame carrying said device, yielding means tending to swing the frame toward the printing line to press the inking device thereagainst, means for swinging the swing frame rearward until the inking device is pressed against the printing line with sufficient force to overcome the pressure upon said frame of said yielding means and then impart downward movement to said frame and inking device to a plane below that of the printing line, means to press the swing frame outwardly as the depressing movement begins to prevent the inking device dragging on the printing line, and means to restore the swing frame and the means for operating the same to normal position.

19. In a laundry marking machine, type characters settable to form a printing line, an inking device, a swing frame carrying said device, yielding means tending to swing the frame toward the printing line to press the inking device thereagainst, means for depressing the inking device below the plane of the printing line, means to press the swing frame outwardly as the depressing movement begins to prevent the inking device dragging on the printing line, means to restore the swing frame and the means for depressing the same to normal position, and means for pressing the swing frame outward during its return to normal position to guard against reëngagement of the inking means with the printing line.

20. In a laundry marking machine, type characters settable to form a printing line, an inking device, a swing frame carrying said device, yielding means tending to swing the frame toward the printing line to press the inking device thereagainst, means for depressing the inking device below the plane of the printing line, means to press the swing frame outwardly as the depressing movement begins to prevent the inking device dragging on the printing line, means to restore the swing frame and the means for depressing the same to normal position, and means actuated by the swing frame for pressing the latter outward during its return to normal position to guard against reëngagement of the inking means with the printing line.

21. In a laundry marking machine, type characters settable to form a printing line, an inking device, a swing frame carrying said device, yielding means tending to swing the frame toward the printing line to press the inking device thereagainst, means for depressing the inking device below the plane of the printing line, means to press the swing frame outwardly as the depressing movement begins to prevent the inking device dragging on the printing line, means to restore the swing frame and the means for depressing the same to normal position, and a pivoted deflector to be engaged and swung forward by the swing frame in its returning movement to press the latter outward during its return to normal position to guard against reëngagement of the inking means with the printing line.

22. In a laundry marking machine, a suitable frame, a printing line therein, a swing frame, an inking fountain journaled in said frame, a pad carried by the fountain, means to swing the swing frame upwardly and rearwardly toward the printing line until it engages said first-named frame and then draw said swing frame downward until the inking device is below the plane of the printing line, means for causing the fountain to rotate during the swinging movement of said frame to cause the pad to press against and apply ink to said printing line before the swing frame engages the first-named frame and begins to move downward, and means to return to normal position the swing frame and the means for swinging the same toward and then moving it below the printing line.

23. In a laundry marking machine, a suitable frame, a printing line therein, a swing frame, an inking fountain journaled in said frame, a pad carried by the fountain, means to swing the swing frame upwardly and rearwardly toward the printing line until it engages said first-named frame and then draw said swing frame downward until the inking device is below the plane of the printing line, means for causing the fountain to rotate during the swinging movement of said frame to cause the pad to press against and apply ink to said printing line before the swing frame engages the first-named frame and begins to move downward, means to return to normal position the swing frame and the means for swinging the same toward and then moving it below the printing line, and means to turn the inking device on its axis during the downward and return movements of said swing frame until it is substantially inverted to permit ink from the fountain to replenish the supply in the pad.

24. In a laundry marking machine, a suitable frame, a printing line therein, a swing frame, an inking fountain journaled in said frame, a pad carried by the fountain, means to swing the swing frame upwardly and rearwardly toward the printing line until it engages said first-named frame and then draw said swing frame downward until the inking device is below the plane of the printing line, means for causing the fountain to rotate during the swinging movement of said frame to cause the pad to press against and apply ink to said printing line before the swing frame engages the first-named frame and begins to move downward, means to return to normal position the swing frame and the means for swinging the same toward and then moving it below the printing line, means to turn the inking device on its axis during the downward and return movements of said swing frame until it is substantially inverted to permit ink from the fountain to replenish the supply in the pad, and means to restore the inking fountain to normal position during the return of the swing frame and the means for operating the same to normal position.

25. In a laundry-marking machine, a swing frame, an inking device journaled thereon and provided with a crank arm, a link pivotally supported eccentrically of the swing frame and forming a fulcrum for said crank arm, located eccentrically of the axis of the inking means, means for swinging said frame and link and thereby utilizing said fulcrum to effect rotation of the inking means, and then moving the frame bodily to cause said fulcruming link to reverse the rotation of the inking means.

26. In a laundry-marking machine, a swing frame, an inking device journaled thereon and provided with a crank arm, a link pivotally supported eccentrically of the swing frame and forming a fulcrum for said crank arm, located eccentrically of the axis of the inking means, means for swinging said frame and link and thereby utilizing said fulcrum to effect rotation of the inking means, and then moving the frame bodily to cause said fulcruming link to reverse the rotation of the inking means, and then moving the fulcruming link until the inking means is substantially inverted.

27. In a laundry-marking machine, a swing frame, an inking device journaled thereon and provided with a crank arm, a link pivotally supported eccentrically of the swing frame and forming a fulcrum for said crank arm, located eccentrically of the axis of the inking means, means for swinging said frame and link and thereby utilizing said fulcrum to effect rotation of the inking means, and then moving the frame bodily to cause said fulcruming link to reverse the rotation of the inking means, and then moving the fulcruming link until the inking means is substantially inverted, and means to return said frame to normal position.

28. In a laundry-marking machine, a swing frame, an inking device journaled thereon and provided with a crank arm, a link pivotally supported eccentrically of the swing frame and forming a fulcrum for said crank arm, located eccentrically of the axis of the inking means, means for swinging said frame and link and thereby utilizing said fulcrum to effect rotation of the inking means, and then moving the frame bodily to cause said fulcruming link to reverse the rotation of the inking means, and then moving the fulcruming link until the inking means is substantially inverted, means to return said frame to normal position, and yielding means for insuring the return of said link to initial position to effect a reverse operation of the inking means.

29. In a laundry-marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing.

30. In a laundry marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, and means to rotate the inking means until the swinging movement of said frame is completed and then reverse rotation of the inking means as the downward movement of the frame occurs.

31. In a laundry-marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, means to rotate the inking means until the swinging movement of said frame is completed and then reverse rotation of the inking means as the downward movement of the frame occurs, and means to press the inking means and frame away from the printing member as the downward movement of the frame begins.

32. In a laundry-marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, means to rotate the inking means until the swinging movement of said frame is completed and then reverse rotation of the inking means as the downward movement of the frame occurs, means to press the inking means and frame away from the printing member as the downward movement of the frame begins, and means to reverse the movements of the swinging frame to restore it to normal position.

33. In a laundry-marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, means to rotate the inking means until the swinging movement of said frame is completed and then reverse rotation of the inking means as the downward movement of the frame occurs, means to press the inking means and frame away from the printing member as the downward movement of the frame begins, means to reverse the movements of the swinging frame to restore it to normal position, and yielding means to cause the means for rotating the inking means to again reverse the rotation thereof to restore it to normal position.

34. In a laundry-marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, means to rotate the inking means until the swinging movement of said frame is completed and then reverse rotation of the inking means as the downward movement of the frame occurs, means to press the inking means and frame away from the printing member as the downward movement of the frame begins, means to reverse the movements of the swinging frame to restore it to normal position, yielding means to cause the means for rotating the inking means to again reverse the rotation thereof to restore it to normal position, and means to press the inking means and frame away from the casing as the return of the parts to normal position is taking place.

35. In a laundry marking machine, a suitable casing, a printing member thereon, a rock arm having a stop, a swing frame pivoted on said arm, an inking means carried by the swing frame, one or more springs for pressing the swing frame toward the casing and against said stop, means for rocking said arm to swing the frame to cause the inking means to yieldingly engage the printing member and the casing and then travel downward on the said casing, means to rotate the inking means until the swinging movement of said frame is completed and then reverse the rotation of the said inking means as the downward movement of the frame occurs, means to press the inking means and frame away from the printing member as the downward movement of the frame begins, means to reverse the movements of the swinging frame to restore it to normal position, yielding means to cause the means for rotating the inking means to again reverse the rotation thereof to restore it to normal position, and a deflector plate pivotally suspended from the casing to press the inking mechanism and frame away from the casing as the return movement of the parts to normal position takes place.

36. In a laundry marking machine, a casing a cover plate hinged to the casing and provided with parallel slots occupying vertical planes, a column of characters along the length of said slots, and horizontal gage marks intersecting said characters and slots, a series of yieldingly-depressed segments pivoted in the casing and provided with corresponding characters spaced to correspond with said gage lines and provided with handles extending out through said slots to swing the segments upward, means for individually securing said segments at the desired points of adjustment, means to collectively trip the securing means to permit the segments to swing downward, means to arrest such movement, and means to cushion the downward movement of the segments.

37. In a laundry marking machine a casing, a cover plate hinged to the casing and provided with parallel slots occupying vertical planes, a column of characters along the length of said slots, and horizontal gage marks intersecting said characters and slots, a series of yieldingly depressed segments pivoted in the casing, and provided with corresponding characters spaced to correspond with said gage lines, and provided with handles extending out through said slots to swing the segments upward, means for individually securing said segments at the desired points of adjustment, means to collectively trip the securing means to permit the segments to swing downward, means to arrest such movement, means to cushion the downward movement of the segments, means to withdraw the cushioning means to permit the downward movement to continue, and means to limit such continued movement.

38. In a laundry marking machine, a casing having an arcuate covering character plate, hinged at one end to the casing, a stud projecting from the casing near the hinge point of the cover, and a dog pivoted to the cover to automatically engage said stud when the cover is swung open to hold it in such condition; said dog having a finger to receive pressure whereby to trip the dog forwardly from the stud to permit the cover to return to closed position.

In testimony whereof, I affix my signature, in the presence of two witnesses.

THOMAS J. HUME.

Witnesses:
H. C. RODGERS,
G. Y. THORPE.